May 9, 1950          B. O'BRIEN          2,506,734
ASPHERIC CONTOURING MACHINE
Filed March 24, 1944
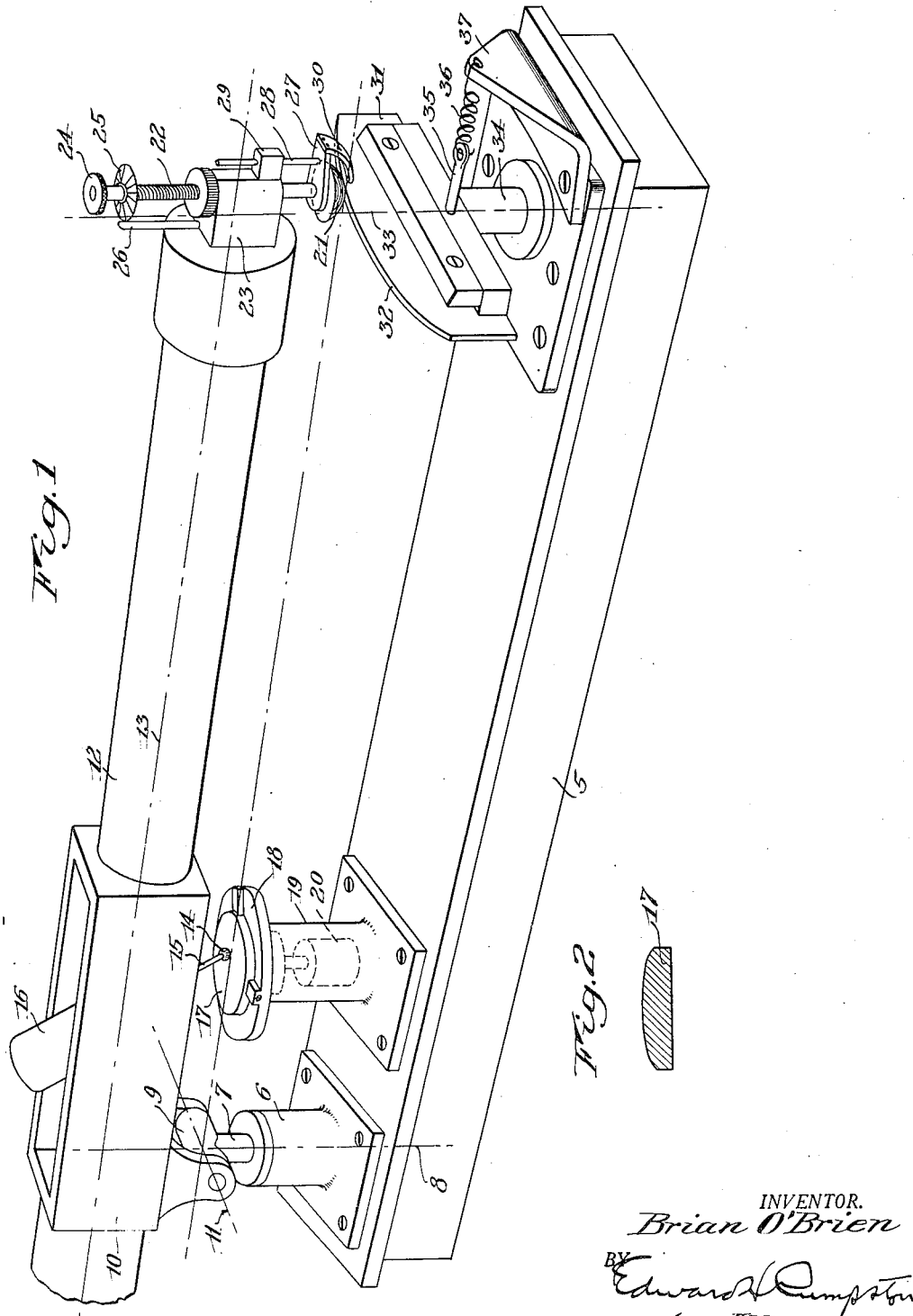
INVENTOR.
Brian O'Brien
BY
Edward H. Cumpston
his Attorney Patented May 9, 1950

2,506,734

UNITED STATES PATENT OFFICE 2,506,734

ASPHERIC CONTOURING MACHINE

Brian O'Brien, Rochester, N. Y.

Application March 24, 1944, Serial No. 527,908

6 Claims. (Cl. 90—13.9)

This invention relates to contouring machines, and, more particularly, to machines for forming work with aspherical contours, one object of the invention being to provide an improved machine of the above character having a more simple and practical means for guiding the tool to produce the desired contours.

Another object of the invention is to provide such a machine having form or pattern means for guiding the tool capable of being readily and quickly manufactured and at a comparatively low cost.

To these and other ends the invention resides in certain improvements and combinations of parts, all as will be hereinafter more fully described, the novel features being pointed out in the claims at the end of the specification.

In the drawings:

Fig. 1 is a perspective view of a machine embodying the present invention, and

Fig. 2 is a central, sectional elevation of a work piece with an aspheric contour such as produced by the machine.

Machines for forming work with aspheric surface contours have heretofore been limited in their utility by the time, effort and expense of making the full duplicate forms or patterns for guiding the tool with relation to the work, and the present invention provides an improved mechanism for such machines, comprising a simplified form or pattern in the nature of a thin plate templet capable of being readily and easily manufactured and of being conveniently employed to produce the desired aspheric surface on the work.

Referring more specifically to the drawings, the embodiment herein disclosed, by way of illustration, preferably comprises an elongated machine base 5, having adjacent one end a supporting standard 6, formed at its upper end with a socket in which a spindle 7 is supported for pivotal movement about a vertical axis 8. Spindle 7 has on its upper end a head 9, on which a frame 10 is mounted for pivotal movement about a horizontal axis, 11, intersecting and perpendicular to axis 8. Frame 10 supports a tool arm 12, the axis 13 of which is normal to the plane of the axes 8 and 11.

A tool 14 is mounted on a rotary spindle 15, carried and driven by any known or suitable means in the frame 10, such as an electric motor, as indicated generally at 16. A work piece 17 is supported in working relation with the tool, as by means of a rotary supporting table 18, of any known or suitable type, mounted on a pedestal 19 on base 5, and rotated by an electric motor in the pedestal, as indicated generally at 20.

The means for guiding the tool are located in the present instance at the other or outer end of the tool arm and base, comprising, preferably, a stylus or follower 21, on a spindle 22, threadedly supported in a head 23 on the outer end of the tool arm. The spindle is adjusted vertically by rotating it by means of a wheel 24, the adjustment being indicated by suitable graduations on the dial 25 fixed on the spindle and a coacting gauge 26 on the head. Rotatably mounted on the spindle also is an arm 27, fixed on a rod 28, sliding vertically in a lug 29 on the head and carrying a depending finger 30, for a purpose hereafter described.

I have discovered a highly advantageous means for guiding and controlling the stylus or follower of such a machine, comprising a simplified form or pattern, in the nature of a templet, provided by a thin, metal plate 31, having an upper edge 32, formed to correspond in shape with an enlarged duplicate of the central sectional profile of the surface to be formed, or, in other words, of the aspherical curve or generatrix which is rotated about an axis of symmetry to generate or sweep out the desired surface, so that the plate edge 32 has at every point thereof an ordinate equivalent to the radially corresponding ordinate of the surface to be produced. Such a guiding surface 32 may be readily formed on the edge of the thin, flat templet 31 and employed to precisely guide the tool, provided the templet is pivotally mounted to oscillate about the axis of symmetry 33, parallel with axis 8, so as to sweep out the aspheric surface, as the tool arm is swung about its axes to move the tool.

The templet 31 is preferably fixed on a spindle 34, oscillating in a bearing in the base 5, about the vertical axis 33, as shown. Means are provided for yieldably returning the templet to a central position, comprising, preferably, a stud 35, fixed to the spindle and connected to one end of a tensioned coil spring 36, having its other end fixed to a bracket 37 on the base.

The means for oscillating the templet 31, to maintain it in cooperative contact with the follower, comprises the guide finger 30, described above, having its end positioned for engagement with a side face of the templet, so as to oppose the tension of spring 36 and maintain the edge of the templet in continuous contact with the follower in all operating positions of the latter.

As the follower 21 at the outer end of the tool arm follows the contour of the templet 31, the tool 14 traces out a reduced replica of the templet contour, the reduction factor being the ratio of the distances of the tool and the follower, respectively, from the intersection of the axes 8 and 11. The active faces of the tool 14 and follower 21 have the same geometrical shape and vary in dimensions in the ratio of the reduction factor. Such active faces of the tool and follower also lie in a straight line passing through the intersection of the pivotal axes 8 and 11 of the tool arm.

The operation of the machine is evident from the above description. A templet, having an edge corresponding to the generatrix curve of the aspheric surface to be formed, is fixed on the spindle 34. Follower 21 is adjusted vertically to maintain its alinement with the tool and the intersection of the pivotal axes of the tool arm, as described. The tool is rotated by motor 16 and the work piece by motor 30, and as the tool arm is swung to grind or cut the work, follower 21 follows the edge 32 of the templet, which is swung to maintain it in such engagement by means of the finger 30 and spring 36.

A thin plate templet, such as described, may be readily formed with the desired generating curve, with a great reduction in the time, effort and cost involved in producing, as a pattern, the full duplicate of the surface to be formed and my improved templet may be employed in manufacturing operations with the same accuracy, speed and convenience as a full duplicate pattern.

It will thus be seen that the invention accomplishes its objects, and while it has been hereinabove described in reference to the details of a preferred embodiment, it is to be understood that such disclosure is intended in an illustrative, rather than a limiting sense, as it is contemplated that various modifications and changes in the construction and arrangement of the parts will readily occur to those skilled in the art within the spirit of the invention and the scope of the appended claims.

I claim:

1. An aspheric contouring machine having an arm pivoted to swing about each of normally intersecting axes, a tool on said arm, a work support mounted for rotation in working relation to said tool, means for continuously rotating said work support, guide means on said arm and a cooperating guide means on said machine, one of said guide means comprising a templet corresponding in shape to a central section of the aspheric surface to be formed and mounted for oscillating movement about an axis parallel to one of the pivotal axes of said arm, as said arm is swung to move said tool back and forth over a work piece on said support and means secured to one of said guide means and continuously engaging the templet for maintaining said templet in contact with the other of said guide means, to guide said tool arm.

2. An aspheric contouring machine having an arm pivoted for rotation about each of normally intersecting axes, a tool on said arm, a work support mounted for rotation in working relation to said tool, guide means on said arm and a cooperating stationary guide means, one of said guide means comprising a templet corresponding in shape to a central section of the aspheric surface to be formed and mounted for pivotal movement about an axis parallel to one of the pivotal axes of said arm and the other of said guide means having a part for pivotally moving said templet to correspond with the movement of said arm, for guiding said arm.

3. An aspheric contouring machine having an arm pivoted for rotation about each of normally intersecting axes, a tool on said arm, a work support mounted for rotation in working relation to said tool, guide means on said arm, cooperating stationary guide means, a templet corresponding in shape to a central section of the aspheric surface to be formed and mounted on one of said guide means for pivotal movement about an axis parallel to one of the pivotal axes of said arm, spring means for yieldably holding said templet in one position, a follower on the other of said guide means for cooperation with said templet, and a part on said other guide means for pivotally moving said templet against the tension of said spring, to maintain engagement thereof with said follower.

4. An aspheric contouring machine having an arm pivoted for rotation about each of normally intersecting axes, a tool on said arm provided with means for rotating the same, a work support provided with means for rotating the same in working relation to said tool, a follower on said arm, a templet corresponding in shape to a central section of the aspheric surface to be formed and mounted for pivotal movement about an axis parallel to one of the pivotal axes of said arm, and means on said arm for pivotally moving said templet to maintain the same in cooperation with said follower during the pivotal movement of said arm.

5. An aspheric contouring machine having a base, a tool arm pivoted at one end for rotation on said base about each of normally intersecting axes, a tool on said arm intermediate the ends thereof and provided with means for rotating the same, a work support mounted on said base for rotation in working relation to said tool, a follower on said arm adjacent the end thereof, a templet corresponding in shape to a central section of the aspheric surface to be formed and mounted for pivotal movement on said base about an axis parallel to one of the rotary axes of said arm, and guide means on said arm for pivotally moving said templet to maintain the same in cooperation with said follower during the pivotal movement of said arm.

6. An aspheric contouring machine having an arm pivoted to swing about each of normally intersecting axes, a rotary tool on said arm, a work support mounted for rotation in working relation to said tool, means for continuously rotating said tool and work support, guide means on said arm and a cooperating guide means on said machine, one of said guide means comprising a templet corresponding in shape to a central section of the aspheric surface to be formed and mounted for oscillating movement about an axis parallel to one of the pivotal axes of said arm, as said arm is swung to move said tool back and forth over a work piece on said support, and the other of said guide means and said tool having active faces of the same geometrical shape varying in dimensions in the ratio of the distances of said guide means and tool from the intersection of said axes, and means secured to one of said guide means and continuously engaging the templet for maintaining said templet in contact with the other of said guide means and guiding said tool arm.

BRIAN O'BRIEN.

REFERENCES CITED

The following references are of record in the file of this patent:

UNITED STATES PATENTS

| Number | Name | Date |
|---|---|---|
| 732,472 | Trentzsch | June 30, 1903 |
| 1,448,239 | Schuessler | Mar. 31, 1923 |
| 1,855,343 | Edgar | Apr. 26, 1932 |
| 2,353,874 | Buchanan | July 18, 1944 |

FOREIGN PATENTS

| Number | Country | Date |
|---|---|---|
| 152,580 | France | Dec. 12, 1882 |